US011214363B2

(12) United States Patent
Ledbetter et al.

(10) Patent No.: US 11,214,363 B2
(45) Date of Patent: Jan. 4, 2022

(54) BEARING FOR AXIAL STIFFENING

(71) Applicant: Bell Textron Inc., Fort Worth, TX (US)

(72) Inventors: Timothy Kent Ledbetter, Euless, TX (US); Thomas Parham, Colleyville, TX (US); Dalton T. Hampton, Fort Worth, TX (US); Frank Stamps, Colleyville, TX (US); Zachary Edwin Dailey, Grapevine, TX (US); Robert L. Milliken, North Richland Hills, TX (US)

(73) Assignee: Bell Textron Inc., Fort Worth, TX (US)

( * ) Notice: Subject to any disclaimer, the term of this patent is extended or adjusted under 35 U.S.C. 154(b) by 0 days.

(21) Appl. No.: 17/068,767

(22) Filed: Oct. 12, 2020

(65) Prior Publication Data

US 2021/0024205 A1 Jan. 28, 2021

Related U.S. Application Data

(63) Continuation of application No. 16/272,091, filed on Feb. 11, 2019, now Pat. No. 10,800,518.

(51) Int. Cl.
*B64C 27/35* (2006.01)
*B64C 27/46* (2006.01)

(52) U.S. Cl.
CPC .............. *B64C 27/35* (2013.01); *B64C 27/46* (2013.01)

(58) Field of Classification Search
CPC ......... B64C 27/35; B64C 27/46; B64C 27/48; B64C 27/51; B64C 27/43; B64C 27/32; B64C 27/82; B64C 2027/8263
See application file for complete search history.

(56) References Cited

U.S. PATENT DOCUMENTS

| 2,949,965 | A | | 8/1960 | De Tore et al. | |
| 3,784,319 | A | | 1/1974 | Amer et al. | |
| 3,790,302 | A | | 2/1974 | Pascher | |
| 4,232,563 | A | * | 11/1980 | Peterson | B64C 27/32 248/635 |
| 4,333,728 | A | | 6/1982 | Drees et al. | |
| 4,466,773 | A | | 8/1984 | Pariani | |
| 4,522,563 | A | | 6/1985 | Reyes et al. | |
| 6,439,849 | B1 | * | 8/2002 | Sehgal | B64C 27/35 416/134 A |
| 6,764,280 | B2 | | 7/2004 | Sehgal et al. | |
| 2002/0136636 | A1 | * | 9/2002 | Sehgal | B64C 27/48 416/104 |
| 2014/0271180 | A1 | * | 9/2014 | Haldeman | B64C 27/52 416/1 |
| 2018/0141650 | A1 | | 5/2018 | Hampton et al. | |
| 2020/0255133 | A1 | * | 8/2020 | Ledbetter | B64C 27/46 |

* cited by examiner

*Primary Examiner* — Igor Kershteyn
(74) *Attorney, Agent, or Firm* — Shackelford, Bowen, McKinley & Norton, LLP

(57) ABSTRACT

An example of a hub for a tail rotor includes a body configured to couple to a mast of a rotor system, a trunnion disposed within the body, first and second shafts disposed on opposite sides of the trunnion, first and second end plates secured to the body, and first and second end bearings, the first end bearing disposed between the first shaft and the first end plate and the second end bearing disposed between the second shaft and the second end plate.

20 Claims, 6 Drawing Sheets

BEARING FOR AXIAL STIFFENING

CROSS-REFERENCE TO RELATED APPLICATION

This application is a continuation of U.S. application Ser. No. 16/272,091, filed Feb. 11, 2019, the contents of which are incorporated by reference in their entirety herein for all purposes.

BACKGROUND

This section provides background information to facilitate a better understanding of the various aspects of the disclosure. It should be understood that the statements in this section of this document are to be read in this light, and not as admissions of prior art.

Helicopters typically include a main rotor that rotates in a generally horizontal plane above the helicopter airframe and a tail rotor that rotates in a generally vertical plane oriented to produce a sideways thrust in the direction of yaw. The pitch of the tail rotor blades, i.e., the angle between the chord line of the blade profile and the direction of rotation of the tail rotor, can be varied so as to increase or decrease the amount of sideways thrust produced by the tail rotor. The sideways thrust of the tail rotor serves three related purposes: first, since the tail rotor is located on a tail boom a distance from the main rotor, its sideways thrust produces a moment which serves to offset the torque produced on the airframe of the helicopter by the rotation of the main rotor blade; second, the sideways thrust of the tail rotor provides yaw axis control for the helicopter; and third, the sideways thrust of the tail rotor may work in conjunction with sideways thrust of the main rotor when the helicopter is translating laterally through the air.

The total sideways thrust produced by the tail rotor is known as the tail rotor authority. Factors affecting the total authority produced by a tail rotor include blade size and profile, rotational speed, angle of attack of the tail rotor blades, the pitch of the tail rotor blades, and the air density. The angle of attack is the angle between the chord line of the blade profile and the "relative wind", i.e., the direction at which the air approaches the tail rotor blade. This angle of attack is affected by the rotor blade pitch, the direction of travel of the helicopter and the presence of cross winds. A cross wind which reduces the angle of attack reduces the overall authority produced by the tail rotor, diminishing the control available to the pilot. The pitch is the angle between the chord line of the blade profile and the direction of blade rotation. The pitch is not affected by cross winds. The pilot controls the pitch of the tail rotor blades through the use of control pedals. Increasing the blade pitch results in greater tail rotor authority and decreasing the blade pitch results in less tail rotor authority. Air density also affects the tail rotor authority. Other factors being equal, the greater the air density, the greater the authority produced by the tail rotor, and similarly, the lower the air density, the less authority produced by the tail rotor.

During operation of a helicopter, various vibrations are generated. The main rotor and tail rotor systems of a helicopter are designed to avoid dynamic loading issues that can be caused by vibrations (e.g., resonance) and negatively impact performance of the helicopter. For example, dynamic loading issues in a tail rotor system can be avoided by tuning the natural frequency of the tail rotor system. The natural frequency of the tail rotor system can be tuned by, for example, altering the design of components within the tail rotor system (e.g., changing shape, size, or mass of components). Determining the natural frequency of a tail rotor system involves complex mathematics that necessarily involves assumptions (e.g., at boundary conditions). As a result, it can be very difficult to precisely design a tail rotor system that avoids all dynamic loading issues, such as resonance.

SUMMARY

An example of a hub for a tail rotor includes a body configured to couple to a mast of a rotor system, a trunnion disposed within the body, first and second shafts disposed on opposite sides of the trunnion, first and second end plates secured to the body, and first and second end bearings, the first end bearing disposed between the first shaft and the first end plate and the second end bearing disposed between the second shaft and the second end plate.

An example of a hub for a tail rotor includes a body configured to couple to a mast, a trunnion disposed within the body, first and second shafts disposed on opposite sides of the trunnion, first and second elastomeric bearings, the first elastomeric bearing being disposed on the first shaft and the second elastomeric bearing being disposed on the second shaft, first and second mounting rings, the first mounting ring disposed between the first elastomeric bearing and an inner wall of the body and the second mounting ring disposed between the second elastomeric bearing and the inner wall of the body, first and second end plates secured to the body, the first and second end plates comprising a dome shape, and first and second end bearings, the first end bearing disposed between the first shaft and the first end plate and the second end bearing disposed between the second shaft and the second end plate.

An example of a system for mounting a teetering helicopter rotor onto a mast includes a body with an aperture therethrough for receiving the mast, a pair of opposed conical shafts extending from the body and on a common axis which perpendicularly intersects an axis of the aperture, elastomeric bearings comprising conical shims therein, the conical shims being circumferentially disposed around the conical shafts and having angles that match the angles of the conical shafts, outer mounting rings having interior and exterior surfaces, wherein the interior surfaces have the same cone angle as the angle of the conical shafts and the exterior surfaces contact an inner wall of the body, and end bearings comprising alternating layers of rubber and metal shims, wherein an axis of the end bearings aligns with the common axis.

An example of a method of improving a rotor system includes providing a body configured to couple to a mast of a rotor system, placing a trunnion within the body, the trunnion comprising first and second shafts, placing first and second elastomeric bearings on the first and second shafts, respectively, placing first and second end bearings adjacent to the first and second shafts, and securing first and second end plates to the body so that the first and second end bearings are disposed between the first and second end plates the first and second shafts, respectively. The first and second end bearings adjust a spring rate of the rotor system along a central axis passing through centers of the first and second elastomeric bearings to move the natural frequency of the rotor system along the central axis away from a fundamental natural frequency of the rotor system.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1A:
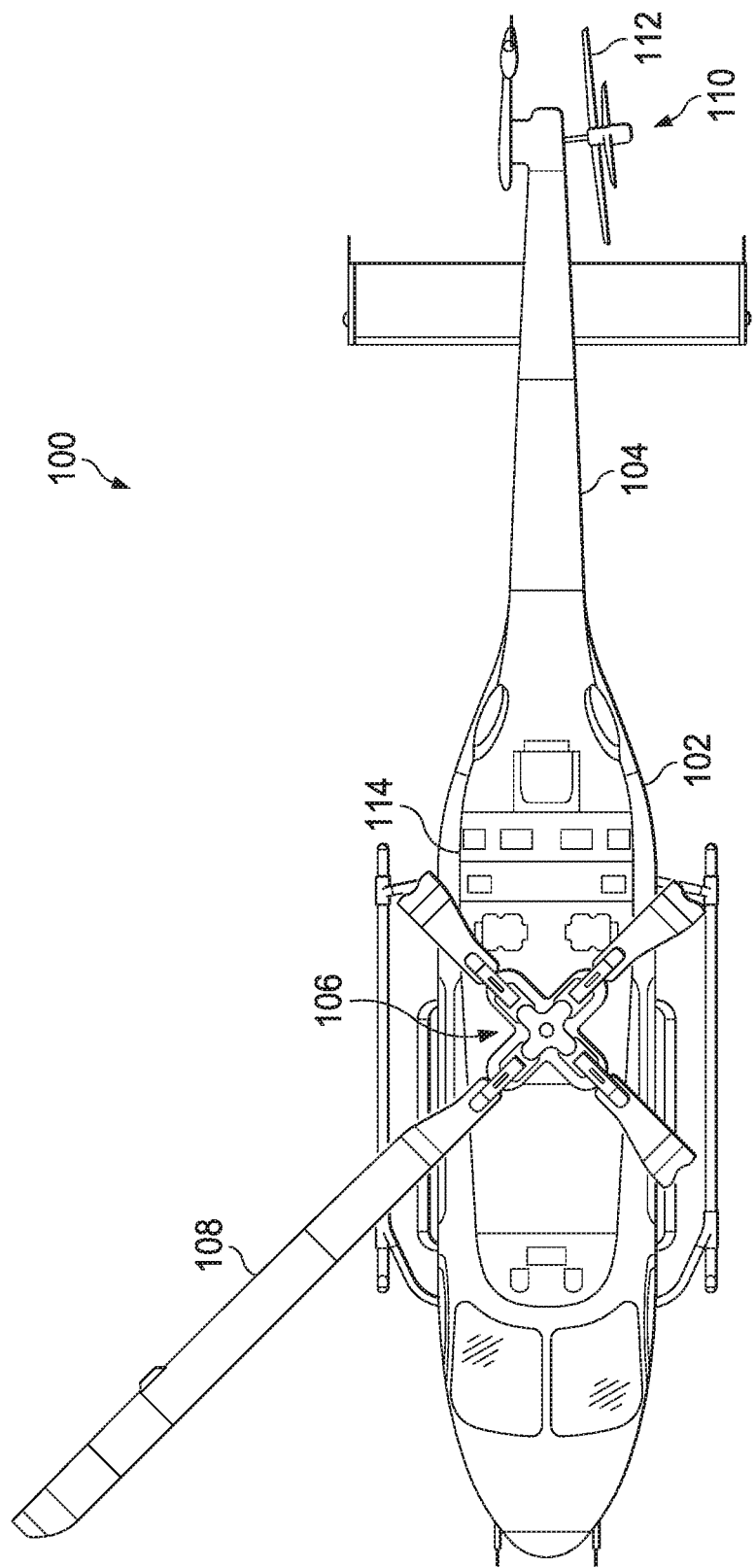
FIGS. 1A and 1B illustrate top and side views, respectively, of a helicopter according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1B:
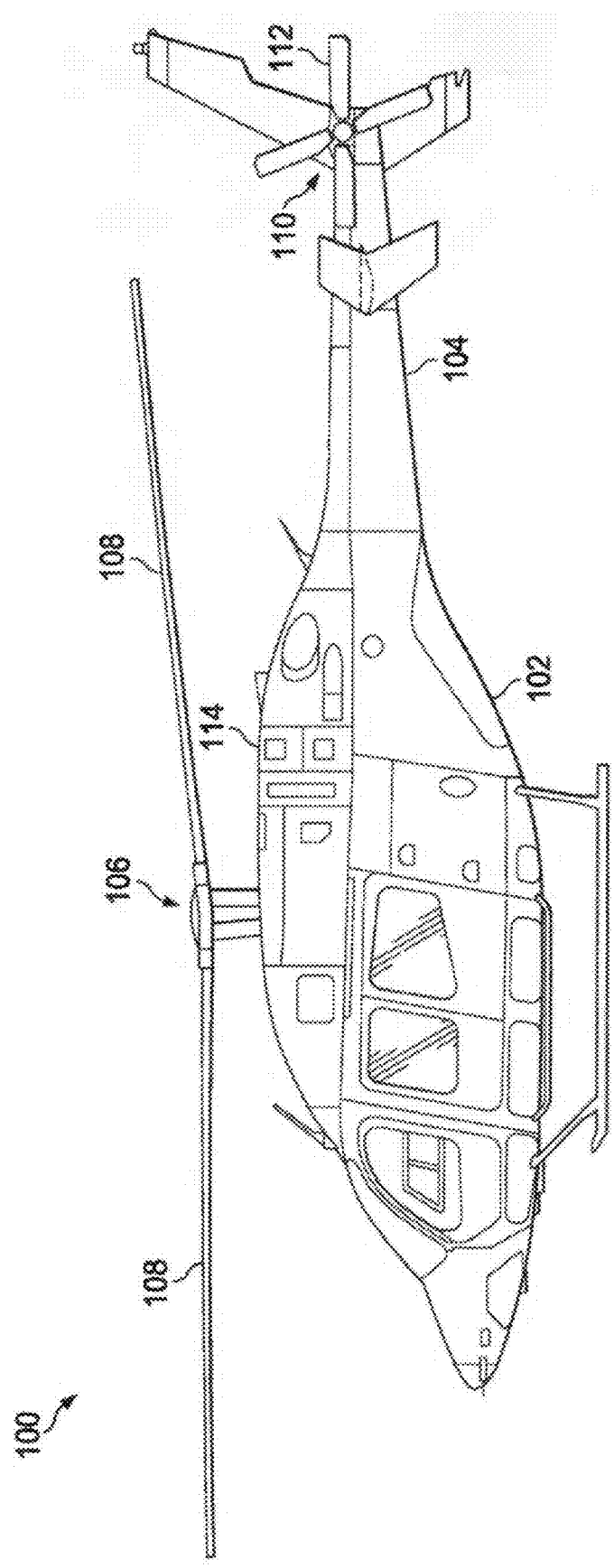

FIGS. 1A and 1B illustrate a top view and a side view, respectively, of a helicopter 100 according to aspects of the disclosure. Helicopter 100 includes an airframe 102 with a tail boom 104. Helicopter 100 also includes a main rotor system 106 that includes a plurality of main rotors 108 and a tail rotor system 110 that includes a plurality of tail rotors 112. Main rotor system 106 and tail rotor system 110 are powered by a power system 114 that is housed in airframe 102. Power system 114 includes at least one engine that provides torque to rotor systems 106, 110.

Figure 2:
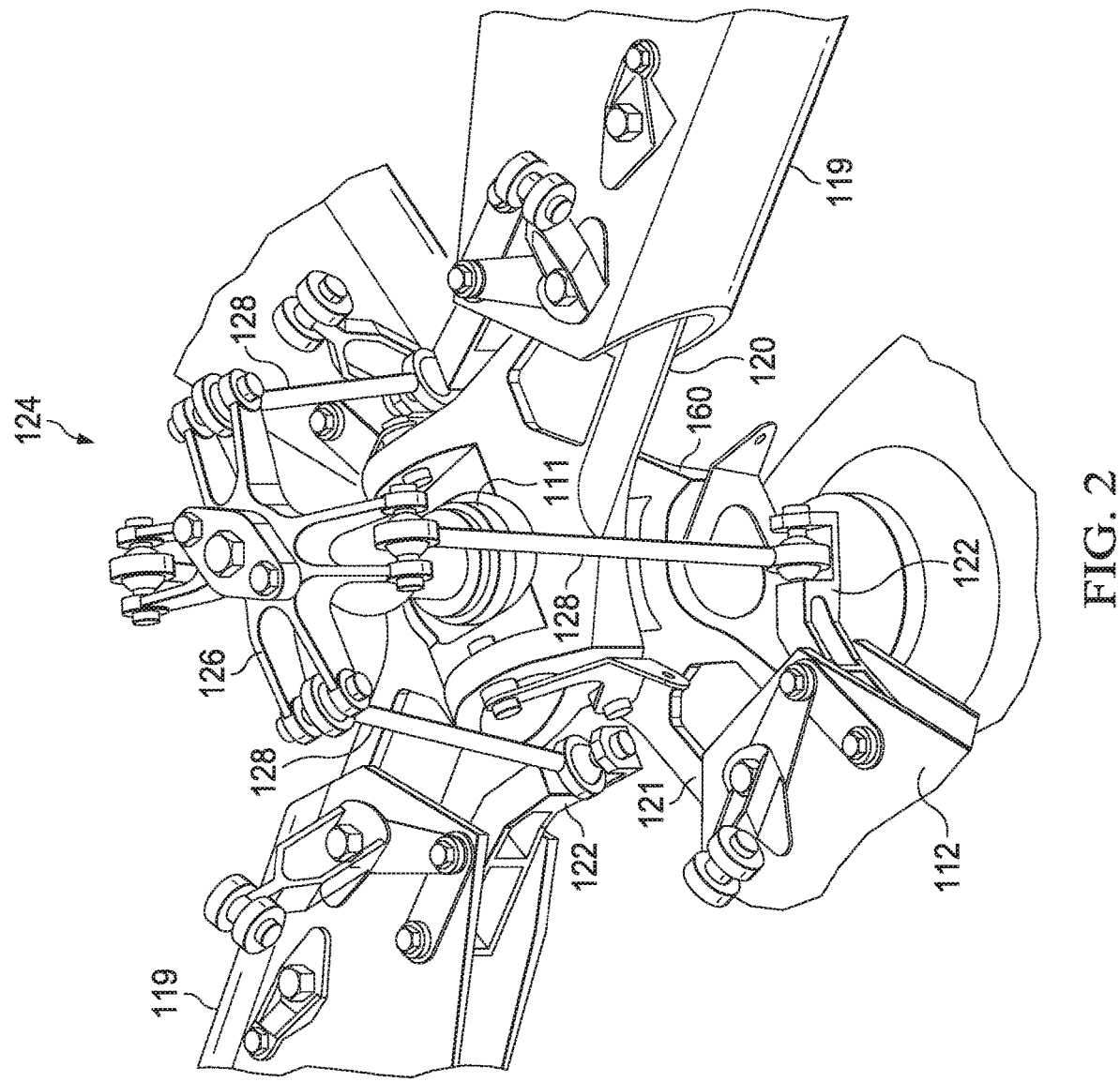
FIG. 2 is a close-up view of a tail rotor system of the helicopter of FIGS. 1A and 1B according to aspects of the disclosure.

FIG. 2 is a close-up view of tail rotor system 110 according to aspects of the disclosure. Tail rotor system 110 includes hubs 120, 121, each of which includes a pair of tail rotors 112. A mast 111 extends through each hub 120, 121 and provides torque from power system 114 thereto. Each tail rotor 112 includes a grip 119 with a pitch horn 122. Each grip 119 is coupled to its respective hub such that axial rotation of grip 119 (and tail rotor 112) is permitted. Axial rotation of grip 119 is controlled by a collective control system 124. Each pitch horn 122 is coupled to a yoke 126 of collective control system 124 via a linkage 128. Axial movement of yoke 126 causes linkages 128 to alter a pitch of tail rotors 112. Altering the pitch of tail rotors 112 varies an amount of thrust generated by tail rotor system 110 and allows a pilot to yaw helicopter 100.

Figure 3:
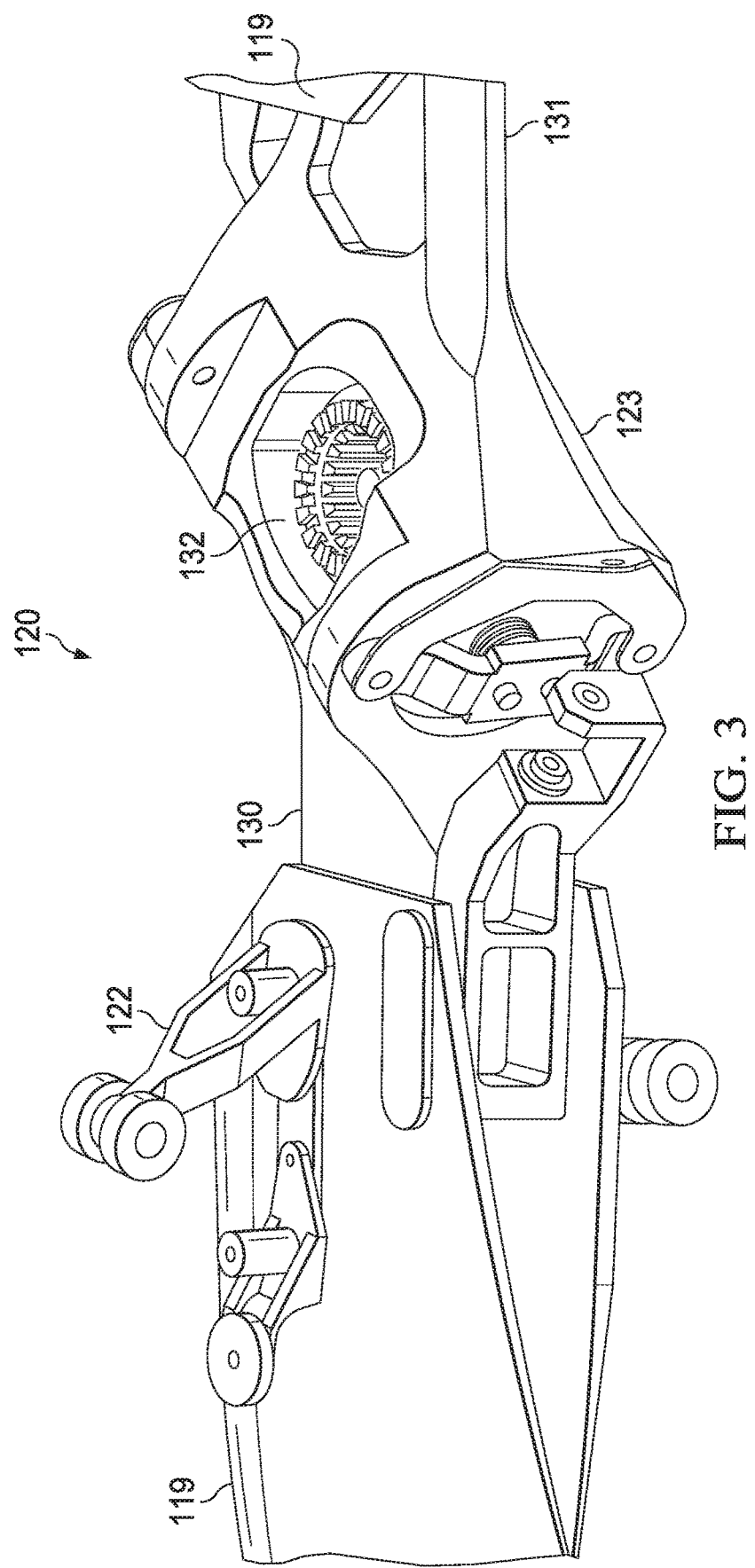
FIG. 3 is a close-up view of a single hub of the tail rotor system according to aspects of the disclosure.

FIG. 3 is a close-up view of hub 120 according to aspects of the disclosure. Hub 121 is substantially similar to hub 120. Hub 120 will be discussed with the understanding that the discussion of hub 120 also applies to hub 121. In FIG. 3, some components have been hidden from view for illustrative purposes. Hub 120 includes a body 123 with arms 130, 131 that extend away therefrom. Arms 130, 131 provide mounting points to which grips 119 attach. Hub 120 also includes an aperture 132 through which mast 111 passes. Hub 120 houses several components, including elastomeric bearings, that are used to support the loads generated by tail rotors 112 during operation of tail rotor system 110. These components will be discussed in more detail relative to FIGS. 4 and 5.

Figure 4:
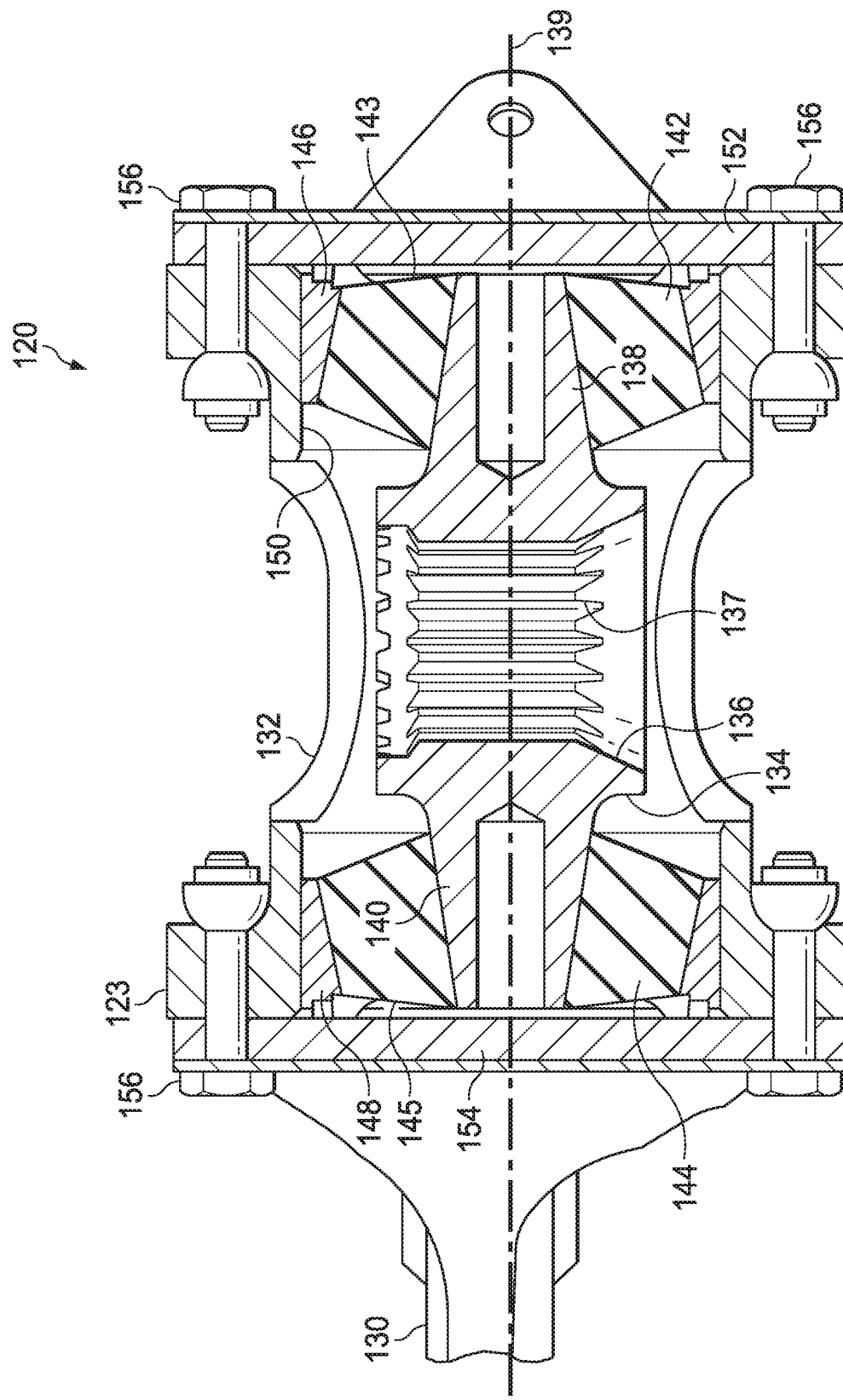
FIG. 4 is a sectioned view of a prior art hub of a hub assembly.

FIG. 4 is a sectioned view of hub 120 with a bearing configuration from the prior art. A trunnion 134 is positioned within hub 120 and includes a splined opening 136 and shafts 138, 140. Splined opening 136 includes splines 137 that mate with corresponding splines of mast 111 for torque transmission. Shafts 138, 140 are located on opposite sides of splined opening 136 and are frustoconical in shape. In other aspects, shafts 138, 140 may have other shapes, such as cylindrical with no taper. Elastomeric bearings 142, 144 are seated about shafts 138, 140, respectively. Elastomeric bearing 142 will be discussed with the understanding that the discussion of elastomeric bearing 142 also applies to elastomeric bearing 144. Elastomeric bearing 142 comprises alternating conical layers of rubber and conical metal shims. The alternating layers form concentric rings with the frustoconical surfaces of shaft 138. In some aspects, elastomeric bearing 142 is adhered to the outer surface of shaft 138.

Mounting rings 146, 148 are adhered to an outer surface of the elastomeric bearings 142, 144, respectively. Mounting ring 146 will be discussed with the understanding that the discussion of mounting ring 146 also applies to mounting ring 148. An outer diameter of mounting ring 146 is sized to closely fit into a bore 150 formed through hub 120. Bore 150 is closed by end plates 152, 154, each of which is secured to hub 120 by a plurality of bolts 156. A portion of mounting ring 146 contacts an inner surface of end plate 152, but the inner surface of end plate 152 is spaced from an end of elastomeric bearing 142 and an end of shaft 138. Thus, as the plurality of bolts 156 are tightened, elastomeric bearing 142 is selectively preloaded by the applied preload force against mounting ring 146. In some aspects, a face 143 of elastomeric bearing 142 is tapered away from end plate 152 so that elastomeric bearing 142 does not contact end plate 152. Mounting ring 146 is keyed to hub 120 so that mounting ring 146 rotates with hub 120 as the tail rotors flap. In order to remove, service or replace the tail rotor bearings of the present disclosure, the plurality of bolts 156 and end plate 152 are removed and then the trunnion 134, along with elastomeric bearings 142, 144 can slide out of bore 150.

The natural frequency of tail rotor system 110 can be tuned, in part, by altering the design of elastomeric bearing 142, which acts as radial spring to allow some movement of tail rotors 112 relative to mast 111 and to dampen vibrations within tail rotor system 110 (e.g., vibrations and/or oscillations caused by operation of tail rotor system 110, tail rotor flapping, and the like). Altering parameters of elastomeric bearing 142, such as the number of alternating layers, the type and thickness of rubber used, and the type and thickness of shim used, allows the effective spring rate of elastomeric bearing 142 to be manipulated, which in turn helps tune the natural frequency of tail rotor system 110.

Determining the natural frequency of tail rotor system 110 involves complex mathematics that necessarily involves assumptions (e.g., at boundary conditions). As a result, it can be very difficult to precisely design a tail rotor system that avoids all dynamic loading issues, such as resonance. In order to check for dynamic loading issues, working prototypes of tail rotor systems are built and tested. After testing, it may become apparent that dynamic loads exist that can cause premature wear. By way of example, it was determined that, in some instances, elastomeric bearings 142, 144 of hub 120 were sometimes wearing prematurely. After careful consideration, the inventors determined that premature wear of elastomeric bearings 142, 144 was due to axial oscillations of elastomeric bearings 142, 144 (e.g., oscillations along the bore of elastomeric bearings 142, 144). As noted above, elastomeric bearings 142, 144 act as radial springs. While the configuration of elastomeric bearings 142, 144 provides resistance in the radial direction (i.e., toward a central axis 139 through shafts 138, 140), elastomeric bearings 142, 144 provide comparatively little resistance in the axial direction (i.e., parallel to central axis 139 through shafts 138, 140). This lack of resistance in the axial direction is by design as normal operational loads do not present loading in the axial direction. However, in some instances dynamic loading can create an oscillatory load in the axial direction. This oscillatory load can prematurely wear elastomeric bearings 142, 144 because elastomeric bearings 142, 144 are not designed to withstand axial oscillatory loads.

Figure 5:
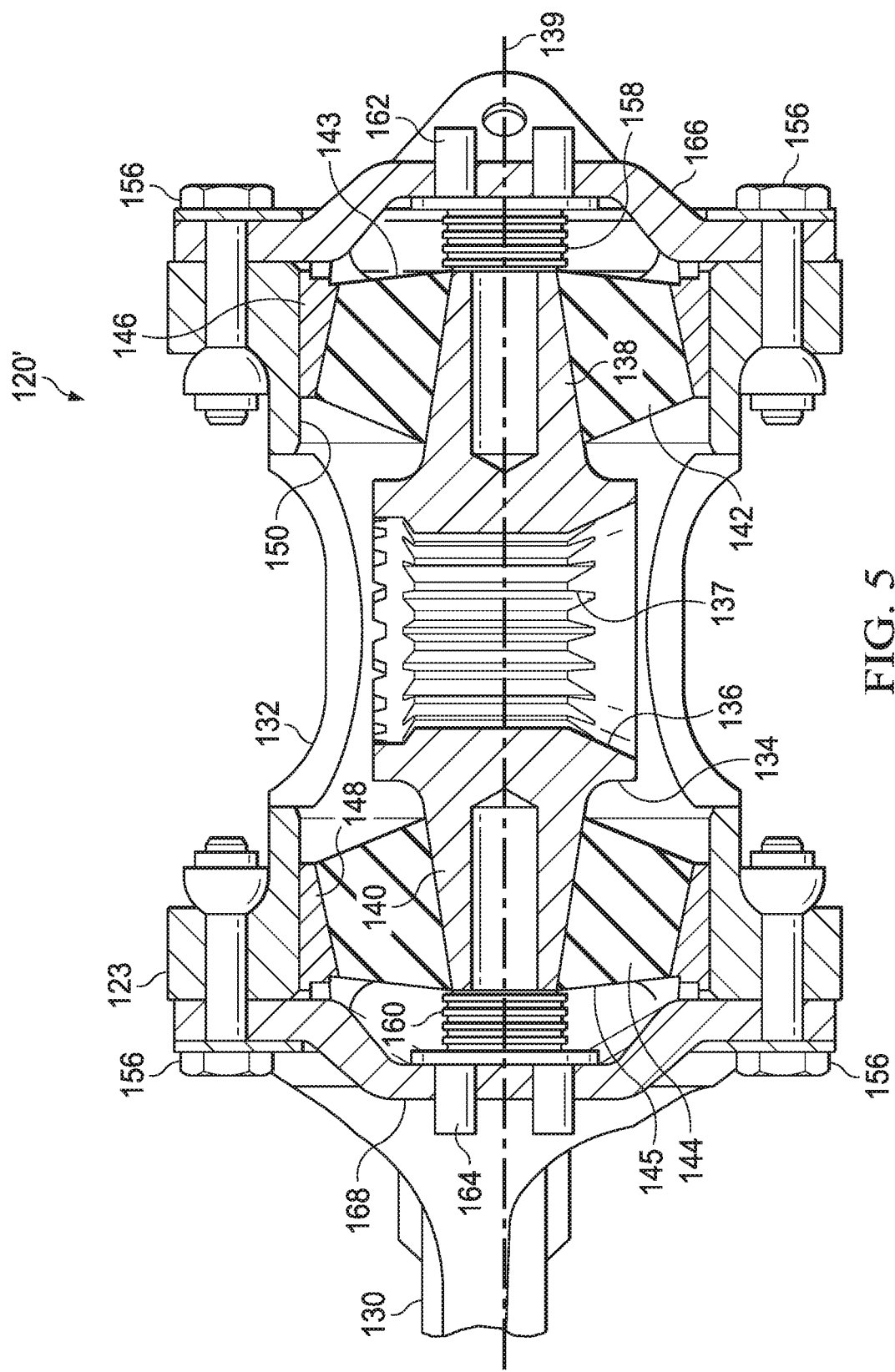
FIG. 5 is a sectioned view of a hub of a hub assembly according to aspects of the disclosure.

Referring now to FIG. 5, an improved hub 120' is illustrated in cross-section. Improved hub 120' includes many of the same parts as hub 120. It should also be understood that hub 121 would similarly include the improvements of improved hub 120'. Parts that are unchanged from FIG. 4 are numbered the same in FIG. 5. Improved hub 120' includes end bearings 158, 160 that abut ends of shafts 138, 140, respectively. In some aspects, end bearings 158, 160 are sized so that no or minimal contact is made with faces 143, 145 of elastomeric bearings 142, 144. Minimal contact is defined herein to mean that less than 5% of the surface area of the faces of end bearings 158, 160 contact faces 143, 145 of elastomeric bearings 142, 144, respectively. No or minimal contact between end bearings 158, 160 and elastomeric bearings 142, 144 is desirable because such contact could alter the performance of elastomeric bearings 142, 144 in the radial direction.

As discussed above relative to FIG. 4, dynamic loading can create an oscillatory load in the axial direction of elastomeric bearings 142, 144. For example, operation of tail rotor system 110 sometimes results in resonance at fundamental frequency of 1/rev. This resonance can create an axial oscillatory load that prematurely wears elastomeric bearings 142, 144 because elastomeric bearings 142, 144 are not designed to withstand axial oscillatory loads. To reduce wear of elastomeric bearings 142, 144, end bearings 158, 160 are used to adjust the spring rate of improved hub 120' along central axis 139 to prevent resonance at the fundamental frequency. Changing the spring rate along central axis 139 changes the natural frequency of improved hub 120' along central axis 139 to avoid axial oscillatory loads, reducing wear of elastomeric bearings 142, 144 caused by the axial oscillatory loads. Thus, by employing end bearings 158, 160, the service life of elastomeric bearings 142, 144 is increased.

In some aspects, end bearings 158, 160 are elastomeric bearings that include alternating layers of rubber and metallic shims. In such aspects, each layer of end bearings 158, 160 is oriented normal to central axis 139. This orientation of the layers provides resistance in the axial direction (i.e., parallel to central axis 139) while providing minimal interference with the radial resistance provided by elastomeric bearings 142, 144. Minimizing the radial resistance of end bearings 158, 160 permits the design of elastomeric bearings 142, 144 to remain unchanged so as to not require other changes to the design of improved hub 120'.

Compared to the design of hub 120, improved hub 120' requires additional space to accommodate end bearings 158, 160. This additional space is provided through the use of domed plates 166, 168. Domed plates 166, 168 include domed portions that extend away from trunnion 134 to provide additional space within improved hub 120' for end bearings 158, 160.

As illustrated in FIG. 5, end bearings 158, 160 include retainers 162, 164, respectively, that extend through domed plates 166, 168, respectively. Retainers 162, 164 removably secure end bearings 158, 160 to domed plates 166, 168. Retainers 162, 164 ensure that end bearings 158, 160 are properly located within improved hub 120' during installation and prevent end bearings 158, 160 from falling freely out of improved hub 120' when domed plates 166, 168 are removed for servicing improved hub 120'.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment or aspect, the terms "substantially," "approximately," "generally," "around," and "about" may be substituted with "within [a percentage] of" what is specified, where the percentage includes 0.1, 1, 5, and 10 percent.

The foregoing outlines features of several aspects so that those skilled in the art may better understand the aspects of the disclosure. Those skilled in the art should appreciate that they may readily use the disclosure as a basis for designing or modifying other processes and structures for carrying out the same purposes and/or achieving the same advantages of the aspects introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An apparatus comprising:
   a body configured to rotate about an axis;
   a trunnion disposed within the body;
   a shaft extending radially from the trunnion; and
   an end bearing disposed radially relative to an end of the shaft opposite the trunnion.

2. The apparatus of claim 1, wherein the end bearing is an elastomeric bearing comprising alternating layers of rubber and metal shims.

3. The apparatus of claim 2, wherein the alternating layers of each of the end bearing are oriented normal to an axis passing through a central axis of the shaft.

4. The apparatus of claim 1, comprising:
   an end plate; and
   wherein the end plate comprises a dome; and wherein at least a portion of the end bearing is disposed within the dome.

5. The apparatus of claim 4, wherein the end bearing comprises a retainer that connects the end bearing to the end plate.

6. The apparatus of claim 1, further comprising:
an elastomeric bearing, the elastomeric bearing being disposed on the shaft; and
a mounting ring, the mounting ring disposed between the elastomeric bearing and an inner wall of the body.

7. The apparatus of claim 6, wherein:
the bearing comprises a face that contacts an end of the shaft; and
the face of the end bearing does not contact the elastomeric bearing.

8. The apparatus of claim 6, wherein the shaft is frustoconical in shape and the elastomeric bearing comprises alternating layers of shims that form concentric rings with the frustoconical shaft.

9. The apparatus of claim 1, wherein the end bearing comprises a retainer that connects the end bearing to an end plate.

10. An apparatus comprising:
a trunnion disposed within a body configured to rotate about an axis;
an elastomeric bearing disposed on a shaft extending radially from the trunnion;
a mounting ring disposed between the elastomeric bearing and an inner wall of the body;
an end plate secured to the body and comprising a dome; and
an end bearing disposed between the shaft and the end plate.

11. The apparatus of claim 10, wherein the end bearing is an elastomeric bearing comprising alternating layers of rubber and metal shims.

12. The apparatus of claim 11, wherein the alternating layers of each of the end bearing are oriented normal to an axis passing through a central axis of the shaft.

13. The apparatus of claim 10, wherein at least a portion of the end bearing is at least partially disposed within the dome of the end plate.

14. The apparatus of claim 10, wherein end bearing comprises a retainer that connects the end bearing to the end plate.

15. The apparatus of claim 10, wherein:
the end bearing comprises a face that contacts an end of the shaft; and
the face of the end bearing does not contact the elastomeric bearing.

16. The apparatus of claim 10, wherein the shaft is frustoconical in shape and the elastomeric bearing comprises alternating layers of shims that form concentric rings with the frustoconical shaft.

17. A method comprising:
providing a body configured to rotate about an axis;
placing a trunnion within the body, the trunnion comprising a shaft;
placing an elastomeric bearing on the shaft;
placing an end bearing adjacent to the shaft; and
securing an end plate to the body such that the end bearing is disposed between the end plate and the shaft; and
wherein the end bearing adjusts a spring rate along a central axis passing through a center of the elastomeric bearing to move a natural frequency along the central axis away from a fundamental natural frequency.

18. The method of claim 17, wherein the end bearing comprises a retainer that connects the end bearing to the end plate.

19. The method of claim 17, wherein:
the end bearing comprises a face that contacts the shaft; and
the face does not contact the elastomeric bearing.

20. The method of claim 17, wherein the end plate comprises a dome that houses at least a portion of the end bearing.

* * * * *